United States Patent
Ruutu et al.

(10) Patent No.: US 7,023,843 B2
(45) Date of Patent: Apr. 4, 2006

(54) PROGRAMMABLE SCHEDULING FOR IP ROUTERS

(75) Inventors: Jussi Ruutu, Espoo (FI); Jani Lakkakorpi, Helsinki (FI); Vilho I. Raisanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/183,057

(22) Filed: Jun. 26, 2002

(65) Prior Publication Data

US 2004/0001491 A1    Jan. 1, 2004

(51) Int. Cl.
H04L 12/56    (2006.01)
H04L 12/28    (2006.01)

(52) U.S. Cl. ............... 370/388; 370/230.1; 370/395.41

(58) Field of Classification Search ........... 370/229, 370/230.1, 231–235, 254, 351, 352, 389, 370/395.41, 400, 401, 412, 413, 414, 428, 370/429, 388

See application file for complete search history.

(56) References Cited

U.S. PATENT DOCUMENTS

| | | | |
|---|---|---|---|
| 2002/0051460 A1* | 5/2002 | Galbi et al. | 370/412 |
| 2002/0057708 A1* | 5/2002 | Galbi et al. | 370/429 |
| 2002/0122428 A1* | 9/2002 | Fan et al. | 370/395.4 |
| 2002/0136230 A1* | 9/2002 | Dell et al. | 370/416 |
| 2002/0150106 A1* | 10/2002 | Kagan et al. | 370/395.6 |
| 2002/0176431 A1* | 11/2002 | Golla et al. | 370/412 |
| 2003/0028663 A1* | 2/2003 | Mullendore et al. | 709/234 |
| 2003/0063562 A1* | 4/2003 | Sarkinen et al. | 370/230 |
| 2003/0118016 A1* | 6/2003 | Kalkunte et al. | 370/389 |
| 2003/0120705 A1* | 6/2003 | Chen et al. | 709/104 |
| 2003/0223365 A1* | 12/2003 | Kowalski | 370/230.1 |

* cited by examiner

*Primary Examiner*—Hanh Nguyen
*Assistant Examiner*—Ahmed Elallam
(74) *Attorney, Agent, or Firm*—Darby & Darby PC; Thomas R. Marquis (57) ABSTRACT

A scheduling system for IP routers is provided. A programmable scheduler for IP routers can support single stage and multistage scheduling. This allows flexible combinations of scheduling and widens dramatically the available QoS solutions to operators. With this kind of scheduling the router can be configured to support almost any known scheduling method or combination. Priority Queuing (PQ) and Deficit Round Robin (DRR) scheduling is scheduling is used according to one embodiment of the invention.

12 Claims, 7 Drawing Sheets

PROGRAMMABLE SCHEDULING FOR IP ROUTERS

FIELD OF THE INVENTION

The present invention relates to IP networks, and more particularly to a programmable scheduling system for IP routers.

BACKGROUND OF THE INVENTION

The introduction of Differentiated Services and other Quality of Service (QoS) methods has necessitated the deployment of several buffers per router output link. Traditionally, router vendors have implemented one, or possibly a few different ways to configure the scheduling between these different buffers for the router. However, this limits the possibilities offered by these technologies to vendor specific solutions and makes it difficult and expensive for operators to modify and update their routers.

Scheduling is an important part of any packet based data network element, such as IP routers. Scheduling is the functionality within the IP routers that decides which queue is served next. Effectively, scheduling decides from which buffer the next transmitted IP packet is picked, which may greatly affect performance.

Recently the increased demand for Quality of Service (QoS) has necessitated new solutions to replace the Best Effort paradigm. For example, Differentiated Services (DiffServ) is a framework standardized by the IETF that is based on the idea of differentiating IP traffic based on QoS requirements. In practice, this means multiple buffers per interface, so that, e.g., delay sensitive traffic can be handled through its own buffers.

The prior art solutions support narrow predefined scheduling schemes. Typically router vendors implement some simple basic schemes and may only allow very limited combinations of the predetermined schemes. This means that when an operator's requirements change, there is a need to upgrade the whole router software to support the change. This may involve, for example, more queues within the router. Effectively, the operator is closely tied with the scheduling model that the router vendor has selected.

From the vendor's point of view the same problem is seen as the need to redesign the scheduling part of IP routers each time that the standards or operators' requirement change. This means extra effort and costs not only for the operator but also for the vendor.

Thus, there is a need for a solution that allows a flexible way to configure the scheduling of IP routers without the need for updating the router software and/or hardware.

SUMMARY OF THE INVENTION

The present invention is directed at addressing the above-mentioned shortcomings, disadvantages and problems, and will be understood by reading and studying the following specification.

Generally, a programmable scheduling system for IP routers is provided. According to one aspect of the invention, a programmable scheduler for IP routers is provided that can support single stage and multistage scheduling. This allows flexible combinations of scheduling and increases the available QoS solutions available to operators.

According to another aspect of the invention, the scheduling for the routers allows a flexible, programmable scheduling in one or many stages. With this kind of scheduling the router can be configured to support almost any known scheduling method or combination. Priority Queuing (PQ) and Deficit Round Robin (DRR) scheduling methods are used according to one embodiment of the invention.

According to yet another aspect of the invention, the routers may be programmed dynamically. Dynamic programming allows on the fly changes to the routers.

According to still yet another aspect of the invention, a Scheduler Configuration Interface is used to adjust the scheduling of the router. A set of scheduling parameters are used to define 1) the number and relative positions of the scheduling stages, 2) the scheduling method applied by each scheduling stage, 3) all relevant parameters for the selected method and 4) the position of the queues in the scheduling hierarchy. Accordingly, the programmable IP router is equipped with an interface that supports the above parameters.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a router. The term "importance" refers to a priority associated with a packet in terms of packet drop. The term "bandwidth broker" refers to a dedicated network element that knows the topology and link loads associated with the network. The term "flow" means a flow of packets. The term "urgency" refers to the packet transfer delay priority. The term support node refers to both "GGSN" and "SGSN" nodes. The term "user" refers to any person or customer such as a business or organization that employs a mobile device to communicate or access resources over a mobile network. The term "operator" refers to any technician or organization that maintains or services an IP based network. "Priority Queuing" (PQ) means that the queue with the highest priority is always served first and the lower priority queues are served only when there are no packets in the higher priority queue(s). "Weighted Fair Queuing" (WFQ) is based on the idea that each queue is assigned a weight that defines how much service the queue receives. "Deficit Round Robin" (DRR) refers to a method where each queue is served periodically and a variable called a "quantum" tells how many bytes are drawn from the queue per turn. A "deficit counter" tells how many bytes the scheduler owes to particular flow. The term "virtual queue" refers to non-physical queues that are used to construct a multi-stage scheduling hierarchy. If all physical queues under a given virtual queue are empty, the virtual queue is removed from the scheduling hierarchy until a packet arrives to one of those physical queues that are under the virtual queue. The term "physical queue" means a real buffer.

Referring to the drawings, like numbers indicate like parts throughout the views. Additionally, a reference to the singular includes a reference to the plural unless otherwise stated or is inconsistent with the disclosure herein.

Briefly described, the present invention is directed at a programmable scheduling method for IP routers. A Programmable Scheduler can be re-configured dynamically to implement one stage or multi-stage scheduling through a Scheduler Configuration Interface. A set of parameters are used to define 1) the number and relative positions of the scheduling stages, 2) the scheduling method applied by each scheduling stage, 3) all relevant parameters for the selected method and 4) the position of the queues in the scheduling hierarchy. Accordingly, the router is equipped with an interface that supports the above parameters. According to one embodiment of the invention, the interface is called a Scheduling Configuration Interface. The programmable & hierarchical scheduler implementation can use various scheduling methods, such as Priority Queuing (PQ) or Deficit Round Robin (DRR) in any scheduling stage.

Illustrative Operating Environment

Figure 1:
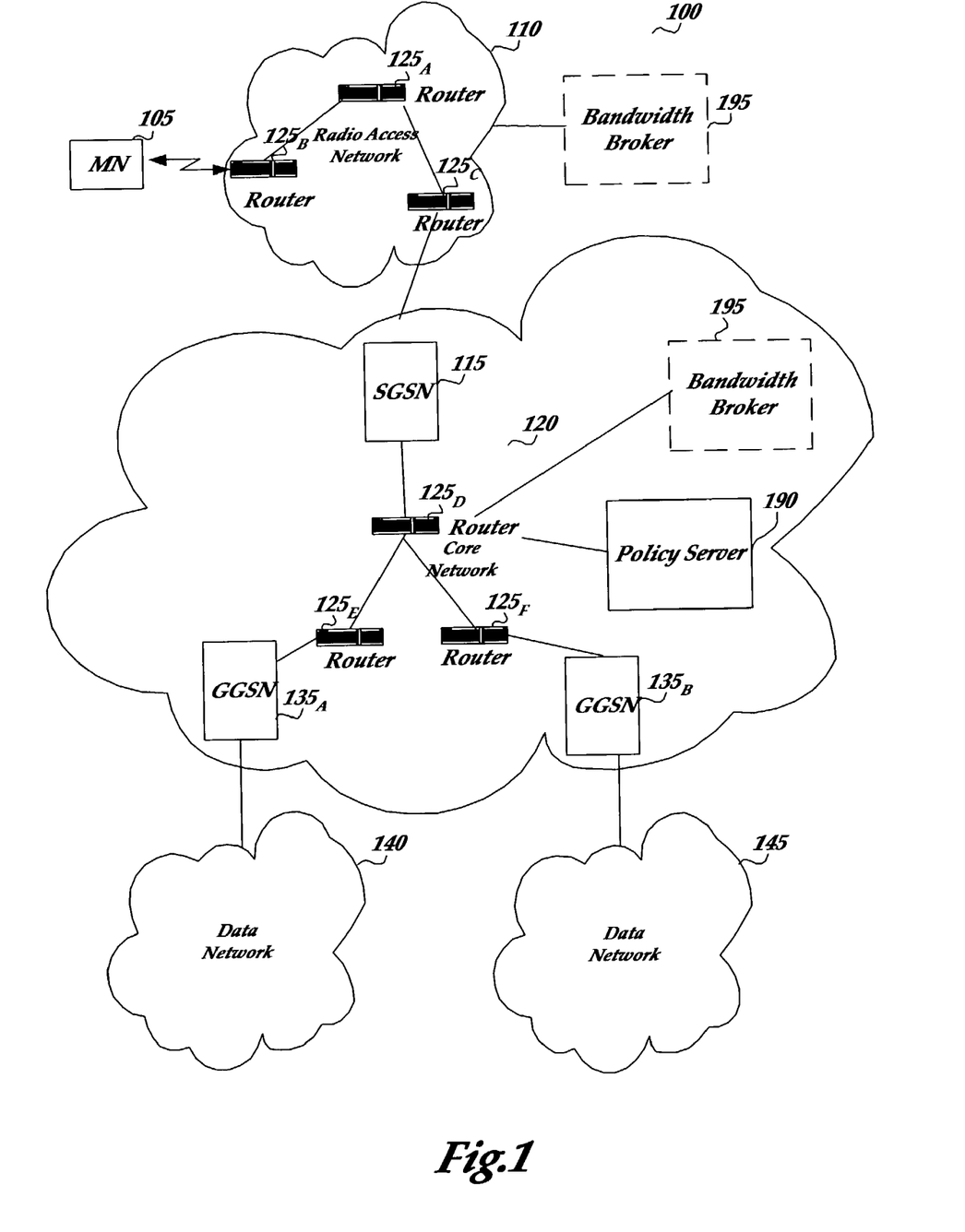
FIG. 1 illustrates an exemplary mobile IP network in which the invention may operate.

With reference to FIG. 1, an exemplary mobile IP network in which the invention may operate is illustrated. As shown in the figure, mobile IP network 100 includes mobile node (MN) 105, radio access network (RAN) 110, SGSN 115, core network 120, routers $125_{A-F}$, policy server 190, optional bandwidth broker (BB) 195, GGSNs $135_{A-B}$, data network 140, and data network 145.

The connections and operation for mobile IP network 100 will now be described. MN 105 is coupled to radio access network (RAN) 110. Generally, MN 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as MS 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like. As shown in the figure, RAN 110 includes routers $125_{A-C}$. Routers $125_{A-C}$ are programmable IP routers that may be configured to support almost any known scheduling method or combination. According to one embodiment of the invention, routers $125_{A-C}$ combine priority queuing (PQ) and deficit round robin (DRR). Bandwidth Broker (BB) 195, or some other network element, may modify the operation of programmable routers $125_{A-C}$ as a response to changing network conditions. These changing network conditions may include transfer delay, load and packet loss, and the like. The configuration of the routers may be a dynamic reconfiguration, even while on-line. Policy server 190, or some other dedicated network element, may be used to provide Quality of Service (QoS) rules relating to how the routers process the packets. Briefly described, policy server 190 may be used to monitor and aid in providing the appropriate behavior model for packet processing within the routers for IP based networks. According to one embodiment, each router may inform the bandwidth broker and the policy server of information relating to its operation and receive information from the bandwidth broker and the policy server to set the parameters and scheduling appropriately.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s $135_{A-B}$ through core network 120. According to one embodiment of the invention, policy server 190 communicates with RAN 110 and core network 120.

Core network 120 is an IP packet based backbone network that includes routers, such as routers $125_{D-F}$, to connect the support nodes in the network, SGSNs, GGSNs, a Policy Server and a Bandwidth Broker. Routers are intermediary devices on a communications network that expedite message delivery. On a single network linking many computers through a mesh of possible connections, a router receives transmitted messages and forwards them to their correct destinations over available routes. Routers may be simple computing devices or complex computing devices. For example, a router may be a computer including memory, processors, and network interface units. According to one embodiment of the invention, routers $125_{D-F}$, as $125_{A-C}$ are programmable IP routers that may be configured to support almost any known scheduling method or combination, such as PQ and DRR, as discussed above.

GGSNs $135_{A-B}$ are coupled to each other, to SGSNs and to external networks through routers $125_{A-C}$ and act as gateways to external networks, such as data network 140 and data network 145. Networks 140 and 145 may be the public Internet or a private data network. GGSNs $135_{A-B}$ allow MS 105 to access network 140 and network 145.

The operator may set QoS rules to determine whether or not to accept a packet based on different service classes for a particular user or group of users. For example, conversational traffic from user group A may be carried using standard EF behavior. The specific user of MN 105 may be differentiated into one of these user groups by an identifier associated with the user. For example, the identifier may be the user Mobile Station Integrated Services Digital Network (MSISDN) number that is known to both the SGSN and the GGSN support nodes.

Policy server 190 is coupled to core network 120 through communication mediums. Policy server 190 may be programmed by an operator with rules to manage the 3GPP quality-of-service (QoS) to IP QoS mapping for mobile IP network 100. More specifically, an operator may generate the rules that are used by the nodes on mobile IP network 100 to help ensure end-to-end QoS. These rules may be supplied to the nodes by policy server 190.

Bandwidth broker 195 is coupled to RAN 110 and core network 120 through communication mediums. BB 195 may be programmed by an operator with rules to manage, among other things, the scheduling parameters associated with the routers.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
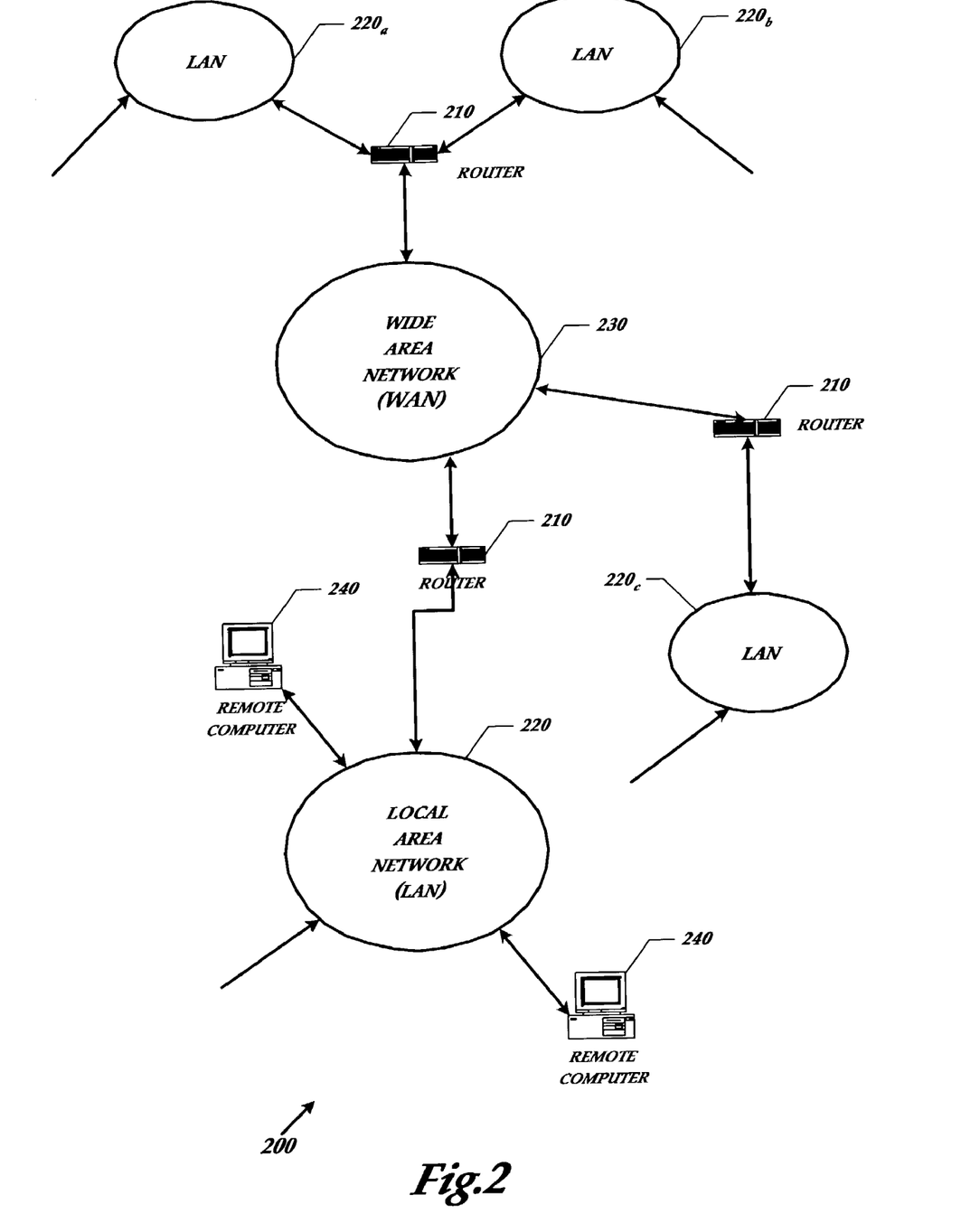
FIG. 2 shows a schematic diagram that illustrates an exemplary system overview in which local area networks and a wide area network are interconnected by routers.

FIG. 2 shows another exemplary system in which the invention operates in which a number of local area networks ("LANs") $220_{a-d}$ and wide area network ("WAN") 230 interconnected by routers 210. On an interconnected set of LANs—including those based on differing architectures and protocols—, a router acts as a link between LANs, enabling messages to be sent from one to another.

Routers 210 are configured such that parameters may be dynamically set to show any desired scheduling scheme. According to one embodiment of the invention, routers 210 are programmable IP routers that may be adjusted to combine PQ and DRR scheduling functionality.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs $220_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Programmable Scheduling for IP Routers

Figure 3:
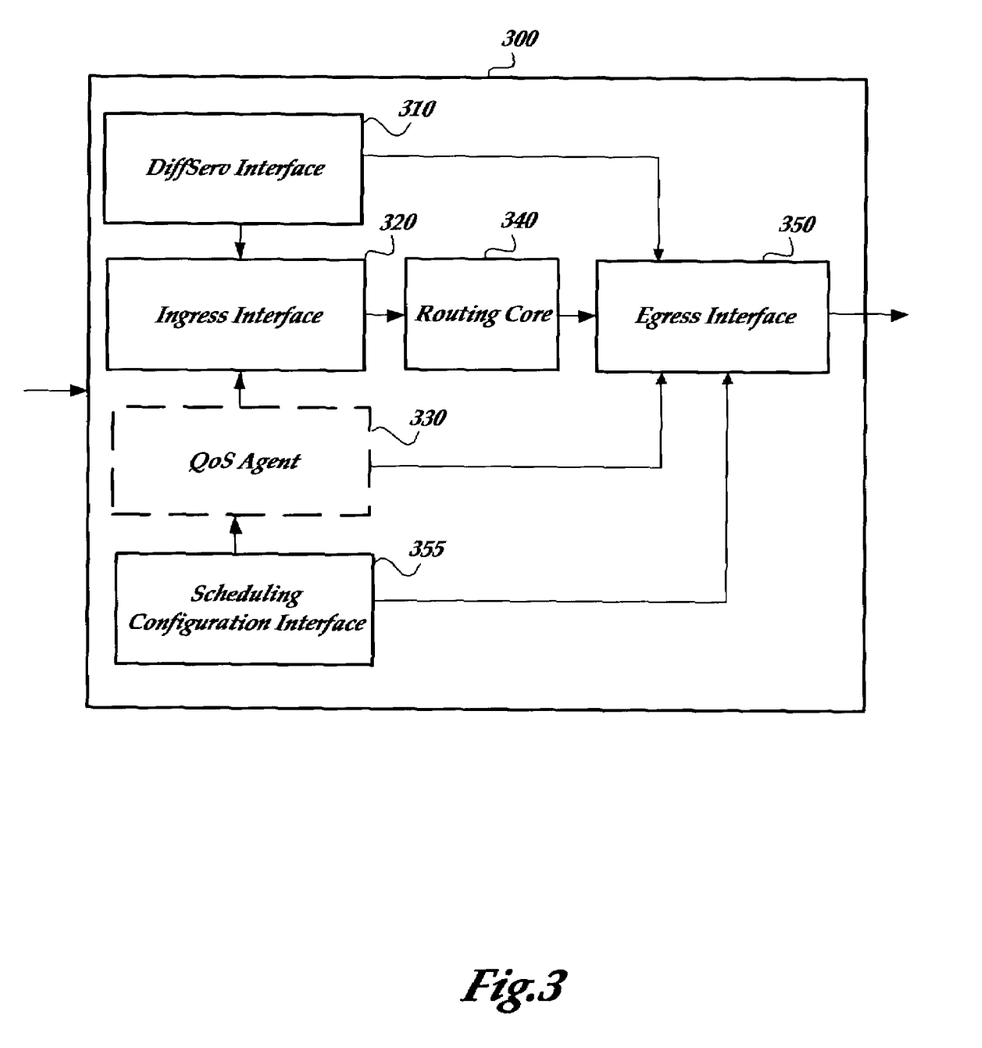
FIG. 3 illustrates a block diagram of an exemplary IP router.

FIG. 3 illustrates a block diagram of an exemplary IP router in accordance with aspects of the invention. As shown in the figure, IP router 300 includes DiffServ interface 310, ingress interface 320, QoS agent 330, scheduling configuration interface 355, routing core 340, and egress interface 350. Router 300 may include many more components than those shown in FIG. 3. However, the components shown are sufficient to disclose an illustrative embodiment for practicing the present invention.

As illustrated in FIG. 3, router 300 is divided into six functional blocks. Routing core 340 provides a router's normal routing and switching functionality. One of the functionalities of the routing core is to select the egress interface for data packets entering through the ingress interface. The routing core moves packets between interfaces according to set policies. For purposes of this discussion, routing core 340 can be thought of as an infinite bandwidth, zero-delay backplane connecting interfaces.

DiffServ interface 310 monitors and provisions DiffServ operating parameters relating to the scheduling system. Monitored parameters may include statistics regarding traffic carried at various DiffServ service levels. These statistics may be used for accounting purposes and/or for tracking compliance to Traffic Conditioning Specifications (TCSs) negotiated with customers. Provisioned parameters are primarily the TCS parameters for Classifiers and Meters and the associated per-hop behavior (PHB) configuration parameters for actions and queuing elements. The operator, typically through a system administrator, interacts with DiffServ interface 310 through one or more management protocols, such as SNMP or COPS protocol, or through other router configuration tools. The operator may interact with DiffServ interface 310 through a bandwidth broker, policy server, a serial terminal, a telnet console, and the like.

Specific policy rules and goals governing the DiffServ behavior of a router are typically installed by policy management mechanisms.

Ingress interface 320, routing core 340 and egress interface 350 are illustrated at the center of the diagram illustrating router 300. In actual router implementations, there may be any number of ingress and egress interfaces interconnected by the routing core. The routing core element serves as an abstraction of a router's normal routing and switching functionality.

Optional QoS block 330 may be used to help enforce QoS requirements. Router 300 may snoop or participate in either per-microflow or per-flow-aggregate signaling of QoS requirements, e.g. using the RSVP protocol. Snooping of RSVP messages may be used, for example, to learn how to classify traffic without actually participating as a RSVP protocol peer. DiffServ router 300 may reject or admit RSVP reservation requests to provide a means of admission control to DiffServ-based services or it may use these requests to trigger provisioning changes for a flow-aggregation in the DiffServ network. If QoS block 330 is included in router 300, it may only be active in the control plane and not in the data plane. In this case, RSVP could be used merely to signal a reservation state without installing any actual reservations in the data plane of router 300. The data plane could still act purely on DiffServ DSCPs and provide PHBs for handling data traffic without the normal per-microflow handling expected to support some services.

Ingress interface 320 provides classification, metering, action, and queuing elements. Classifiers are parameterized by filters and output streams. Packets from the input stream are sorted into various output streams by filters which match the contents of the packet or possibly match other attributes associated with the packet. The simplest classifier element is one that matches all packets that are applied at its input. In this case, the classifier may be omitted. A classifier may also classify the input streams according to their service class.

Ingress interface 320 may be configured to identify traffic into classes, meter it, and ensure that any excess traffic is appropriately dealt with according to the PHB. For example, for AF behavior, this may mean marking excess traffic; for EF, this may mean dropping excess traffic or shaping it to a maximum rate.

A packet arriving at ingress interface 320 picks up its policy from a classifier, which selects traffic according to some specification for each traffic class. Typically, a classifier identifies a variety of traffic and breaks it up into separate classes. According to one embodiment of the invention, packets are classified according to an importance priority and an urgency priority. More priorities may be implemented.

For network planning and perhaps other business purposes, such as for billing purposes, arriving traffic is normally counted. Therefore, a count action is configured. Also, traffic may be marked or remarked with the appropriate DSCP by a mark action. The operator may select the importance and urgency levels according to their business model. For instance, if the operator desires to maximize instant revenues, importance should have a direct relationship to the financial benefit of the packet to the network operator. When the objective of the operator is to support the primary business of the enterprise, preference could be given to those applications that are important to reach that objective.

Marking of the packet priorities is typically done in the first node that is controlled by the network operator. The packet typically does not need further marking by any of the other nodes. According to another embodiment of the invention, marking of the packet may be done in the mobile node. Under this scenario, a confidential relationship between the user and the operator is established. Packets may also be remarked. For instance, the packets may be re-classified at the boundaries between network domains.

A metering element may be used to determine whether the stream is within a predetermined rate by monitoring real-time traffic conditions. As a result of the information obtained by the metering element actions may be triggered within the DiffServ router. For example, a metering element may be used to determine when the customer is being served according to their service level agreement (SLA). A meter measures the rate at which packets making up a stream or flow of traffic pass it, compares the measured rate to some set of thresholds and produces some number of potential results. A packet is said to conform to a specified level if, at the time that the packet is being examined, the stream appears to be within the rate limit for the profile associated with that level.

An action element sets the action to be applied to the packet. For example, the action element may mark a packet, drop a packet according to the classification and queue in question, multiplex, count, or perform a null action. Actions are events in a DiffServ interface that may affect the packet. An action may calculate statistics on traffic in various configured classes, mark it with a DSCP, drop it, or queue it before passing it on for other processing.

DiffServ codepoint (DSCP) Markers are elements which set a codepoint (e.g. the DSCP in an IP header). The DSCP markings are typically applied either by a trusted upstream node, e.g. a customer, or by the edge routers on entry to the DiffServ network. DSCP Markers may also act on unmarked packets (e.g. those submitted with DSCP of zero) or may re-mark previously marked packets. The mark set in a packet will determine its subsequent PHB treatment in downstream nodes of a network and possibly also in subsequent processing stages within router 300. DSCP Markers for DiffServ are normally parameterized by a single parameter: the 6-bit DSCP to be marked in the packet header.

Egress interface 350 is arranged to receive data from DiffServ interface 310, routing core 340, scheduling configuration interface 355 and QoS block 330. Egress interface 350 also includes an output for outputting packets using the appropriate scheduling configuration. As mentioned above, many actions may be applied to the packets.

Queuing elements modulate the transmission of packets belonging to the different traffic streams and determine their ordering, possibly storing them temporarily or discarding them. Packets are usually stored either because there is a resource constraint (e.g., available bandwidth) which prevents immediate forwarding, or because the queuing block is being used to alter the temporal properties of a traffic stream (i.e. shaping). However, when several queues are used together in a queuing system, they can also achieve effects beyond that for given traffic streams. They can be used to limit variation in delay or impose a maximum rate (shaping), to permit several streams to share a link in a semi-predictable fashion, or to move variation in delay from some streams to other streams. The queuing elements in router 300 may be used to implement different behaviors, such as AF/EF behavior.

Scheduling configuration interface 355 includes parameters that set the scheduling of router 300. Generally, a scheduler is an element which gates the departure of each packet that arrives at one of its inputs, based on a service discipline. The scheduler typically has one or more inputs and one output. Each input has an upstream element to which it is connected, and a set of parameters that affects the scheduling of packets received at that input. The scheduler may utilize a variety of scheduling algorithms, including, but not limited to, priority queuing and deficit round robin. Other scheduling algorithms may also be used. Scheduling configuration interface uses a set of scheduling parameters to define 1) the number and relative positions of the scheduling stages, 2) the scheduling method applied by each scheduling stage, 3) all relevant parameters for the selected method and 4) the position of the queues in the scheduling hierarchy. Schedulers may be used to shape traffic streams to match some profile by delaying packets that might be deemed non-conforming by some downstream node: a packet is delayed until such time as it would conform to a downstream meter using the same profile. PHBs, such as the class selectors, or AF/EF, have descriptions or configuration parameters which strongly suggest the sort of scheduling discipline needed to implement them.

Figure 4:
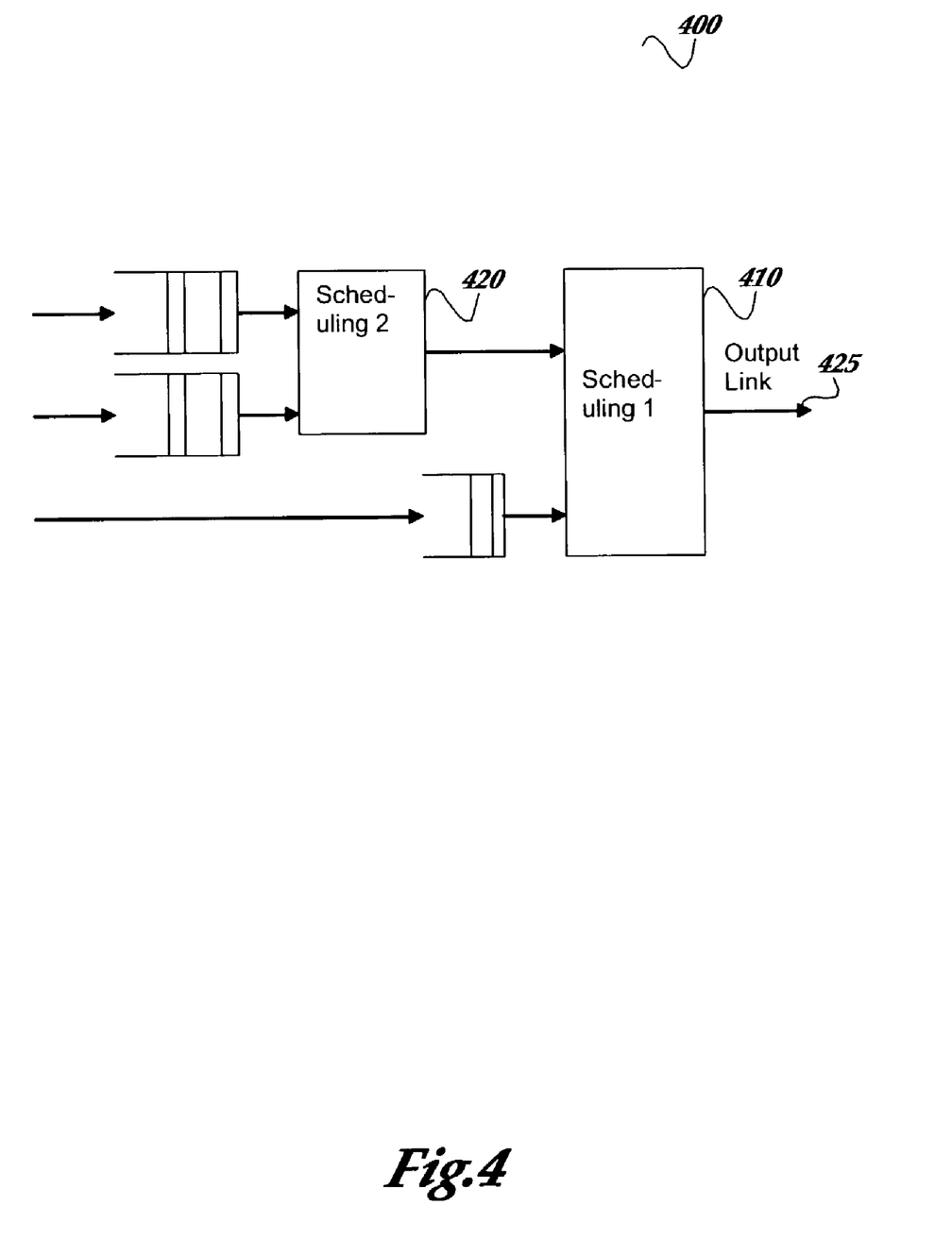
FIG. 4 illustrates queues with a multi-stage scheduling system.

FIG. 4 illustrates queues with a multi-stage scheduling system, in accordance with aspects of the invention. As shown in the figure, system 400 includes scheduling 1 system 410, and scheduling 2 system 420.

In this exemplary case, the aim for the multi-stage scheduling system is for more controlled bandwidth share among traffic classes. This is especially needed at radio interfaces when traffic must be handled in a flow-based manner.

The combination of scheduling methods can be used with one-stage or multi-stage scheduling. In the latter case the stages can have completely different kind of scheduling methods. For example, the first stage (410), closest to the output link 425, can share the link bandwidth using weighted scheduling but the second stage scheduling (420) may use priority queuing.

Figure 5:
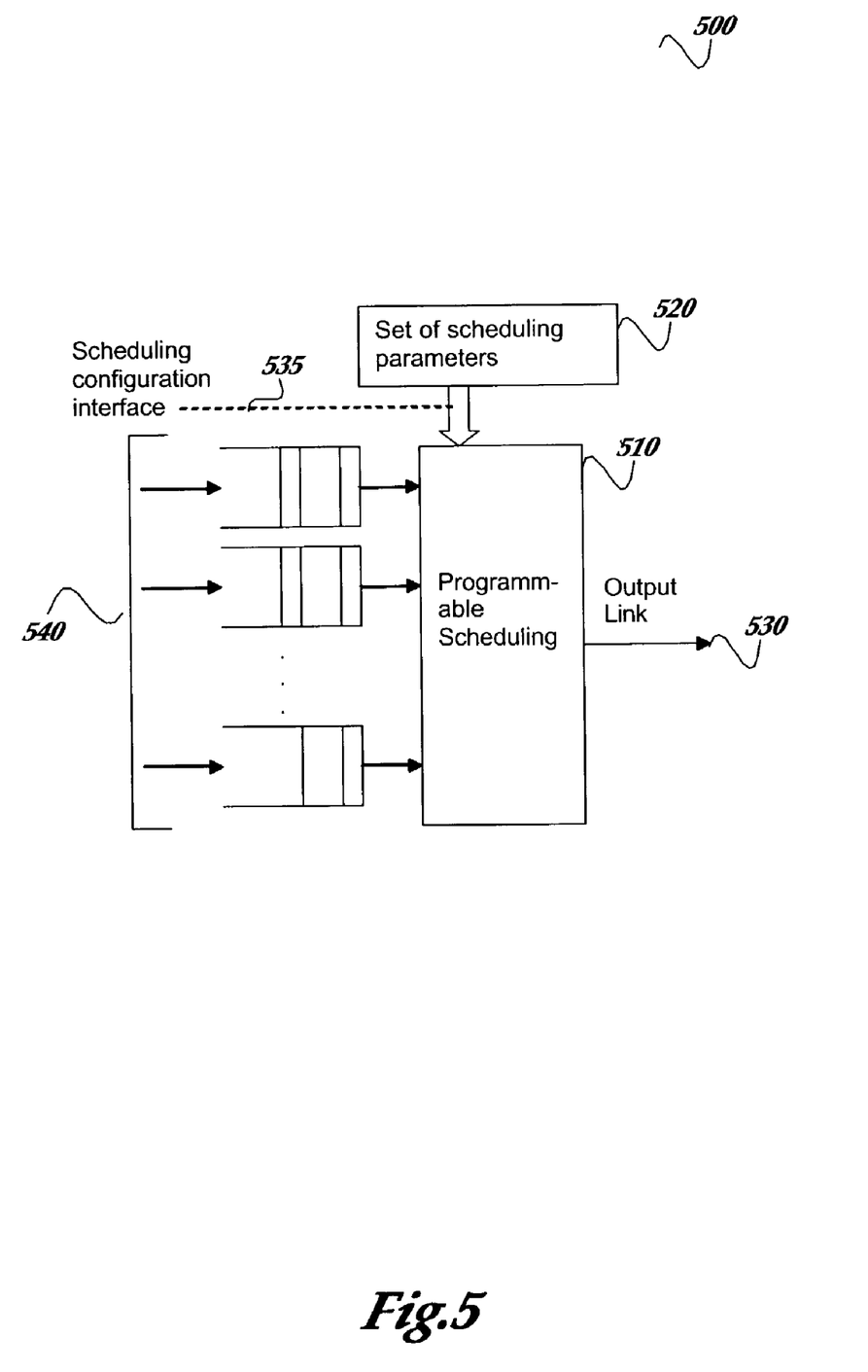
FIG. 5 illustrates a programmable scheduling system for an IP router.

FIG. 5 illustrates a programmable scheduling system for an IP router, in accordance with aspects of the invention. As shown in the figure, scheduling system 500 includes programmable scheduling 510, set of scheduling parameters 502, output link 530, scheduling configuration interface 535, and queues 545.

According to one embodiment of the invention, programmable scheduling box 510 is a scheduler that can be re-configured dynamically to implement a one stage or multi-stage scheduling through Scheduler Configuration Interface 535. A set of scheduling parameters (520) are used to define 1) the number and relative positions of the scheduling stages, 2) the scheduling method applied by each scheduling stage, 3) all relevant parameters for the selected method and 4) the position of the queues in the scheduling hierarchy. Accordingly, the programmable IP router is equipped with an interface that supports the above parameters. According to one embodiment of the invention, the interface is called a scheduling configuration interface. According to one embodiment of the invention, the programmable and hierarchical scheduler implementation can use various scheduling methods, such as Priority Queueing or Deficit Round Robin; in any scheduling stage.

As illustrated in the figure, the router output consists of two or more physical queues. These queues can be implemented in hardware or software and their number N may be configurable. According to one embodiment of the invention, each physical queue is assigned a set of parameters including a stage parameter, a higher stage parameter, a method parameter, and scheduling parameters. The stage parameter is the scheduling stage for the queue. The higher stage parameter refers to a higher stage to which the stage is connected. The method parameter refers to the scheduling method used in this stage. According to one embodiment of the invention, the scheduling method may be PQ or DRR. Other scheduling methods may be used. The scheduling parameters are the relevant parameters for the selected scheduling method. For example, serving order in PQ, or scheduling weight—quantum—in DRR.

The parameters are given as input for the Programmable PQ/DRR Scheduler that reconstructs the scheduling hierarchy and applies the parameters to obtain the desired scheduling method.

Effectively, for each physical queue a path through the scheduling hierarchy is defined. This defines, in an unambiguous way, the operation of the scheduler.

According to one embodiment of the invention, a linked list, starting at stage 1, is used to define the scheduling method. The link list is built according to the number of queues and their parameters (Stage, Higher stage, Method, Parameters).

According to one embodiment of the invention, the linked list of all physical and virtual queues is maintained according to the rules used in the original DRR algorithm. When a queue (virtual or physical) becomes empty, it is removed from the list. When a queue (virtual or physical) becomes non-empty, it is added to the tail of the list. When a DRR queue has been served (and the queue remains non-empty), it is first removed from the list and then added to the tail of the list.

This mechanism does not affect the Priority Queues (virtual or physical), since the serving order is marked to these queues. Since the queues carry their stage number, we can use the same list for all stages.

Figure 6:
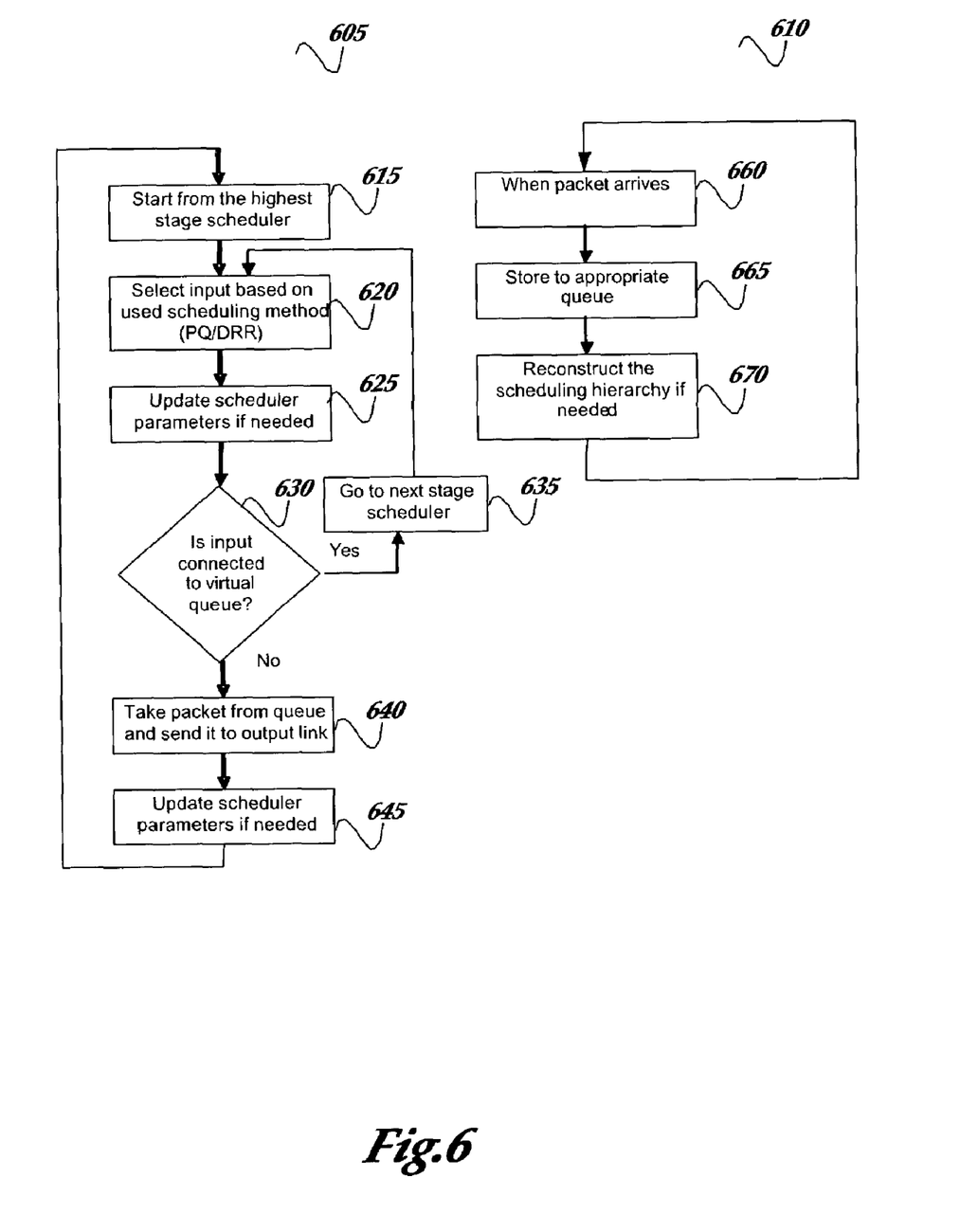
FIG. 6 illustrates a process for a programmable scheduling method.

FIG. 6 illustrates a process for a programmable scheduling method, in accordance with aspects of the invention. For purposes of explanation, the process flow is based on the idea that the router has two processes.

The first process (610) begins at block 660 at which point the packet arrives. Moving to block 665, the arriving IP packet is stored to the appropriate physical queue, based on, for example, the DiffServ Code Point (DSCP) at the IP packet header. After the packet arrival, and the storing of the packet to the appropriate queue, the process transitions to block 670 at which point the scheduling hierarchy is reconstructed (if needed).

The second process (605) starts from the highest level scheduler at block 615, which is connected to the output link. Moving to block 620, the scheduler selects an input based on the scheduling method. According to one embodiment of the invention, the scheduling method may be a combination of PQ and DRR. Transitioning to block 625, if needed, the scheduler parameters are updated (deficits are subtracted by quantums in the case of DRR). Flowing to decision block 630 a determination is made as to whether the input is connected to a virtual queue (instead of a physical one). When it is, the process flows to block 635 where the process is repeated at the next stage. When the input is not connected to a virtual queue, then the physical queue is found and the process moves to block 640. At block 640, the packet is taken from the queue and transmitted to output link. Next, at block 645, the scheduler parameters may be updated if needed.

Figure 7:
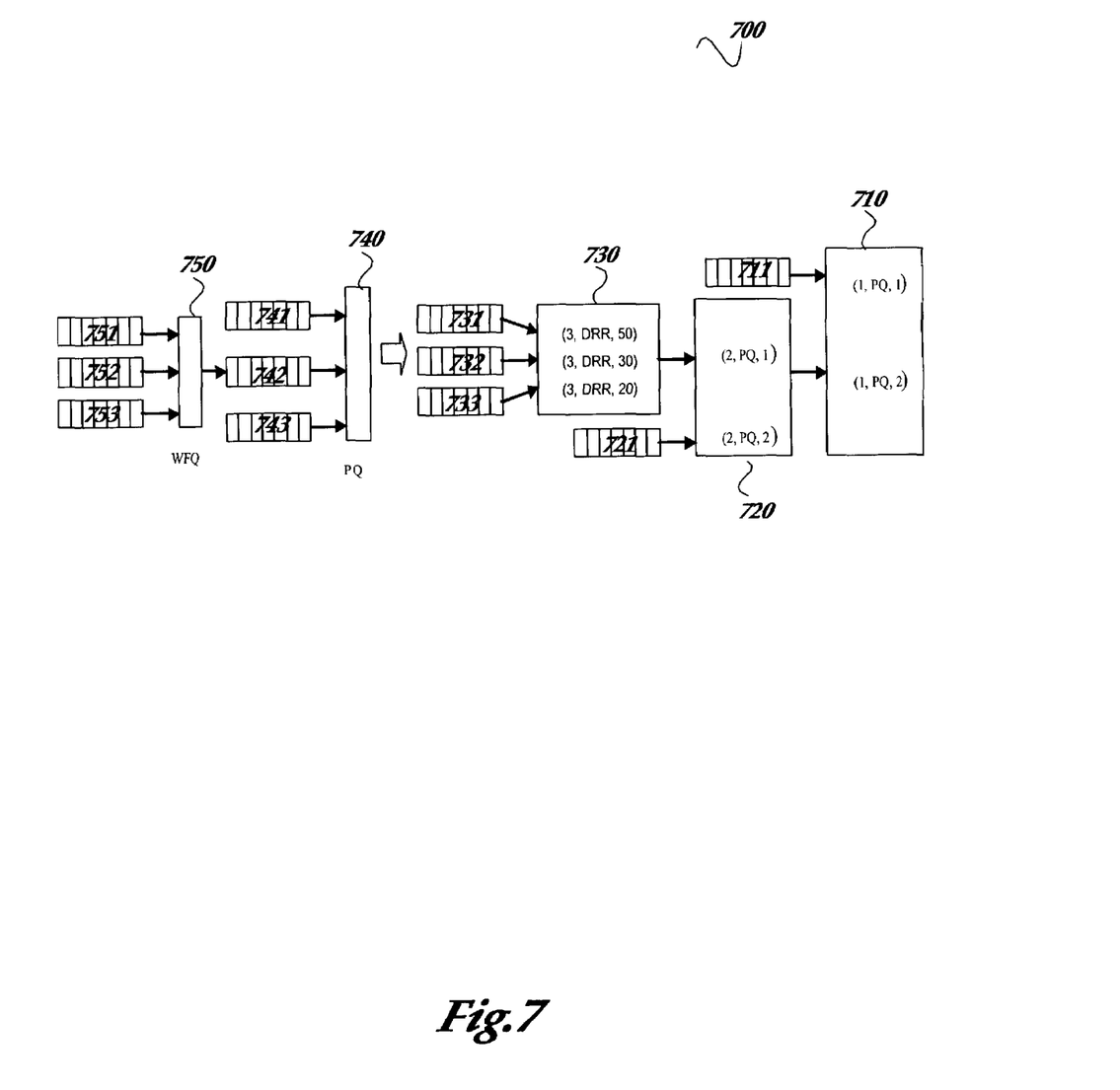
FIG. 7 illustrates how a general two-stage queuing model can be implemented with Programmable PQ/DRR Scheduler, in accordance with aspects of the invention.

FIG. 7 illustrates how a general two-stage queuing model can be implemented with Programmable PQ/DRR Scheduler, in accordance with aspects of the invention. As shown in the figure, queuing model 700 includes stage 710, stage 720, stage 730, stage 740, and stage 750.

Stage 750 is coupled to three queues (751–753) and uses weighted fair queuing. Stage 740 is coupled to queues 741–743 and uses priority queuing. Stage 730 is coupled to queues 731–733 and uses DRR, wherein the scheduling rates (quantums) are 50, 30, and 20, respectively for the three queues. Stage 720 is coupled to the output of stage 730 and queue 721 and uses PQ and has a serving order of 1 and 2, respectively, for the queues. Stage 710 is coupled to queue 711 and the output of queue 720 and uses PQ with scheduling weights of 1 and 2, respectively.

The present invention provides many advantages. One advantage is that the same implementation of the router product can be extremely future-proof in terms of scheduling. When an boperator's requirements change, no new implementation is needed. This reduces R&D costs for routers. In addition, this kind of solution can be expected to be popular among operators. The risk for an operator to select the wrong QoS approach for IP routers is heavily reduced.

Another advantage is that there are no restrictions for scheduling the router, such as only being able to choose from a small set of predefined scheduling methods and make some simple combinations, typically only on one stage.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for a programmable scheduler that can support single stage and multi-stage scheduling, comprising:
an interface arrangement configured to receive and output packets;
a routing core coupled to the interface arrangement that is configured to provide routing and switching functionality relating to the packets; and
a scheduling configuration interface coupled to the routing core and the interface arrangement, and arranged to provide a scheduling configuration, wherein the scheduling configuration interface may be programmed to implement an scheduling algorithms; the interface arrangement is configured to output packets according to the scheduling configuration; the scheduling configuration interface that may be programmed to implement the scheduling algorithms, further comprises programming the scheduling algorithms dynamically; scheduling parameters are provided to the scheduling configuration interface that are used to determine the scheduling configuration; and wherein the scheduling parameters define a number and relative positions of scheduling stages, a scheduling method applied by the scheduling stages, parameters for the scheduling method and a position of queues in a scheduling hierarchy.

2. A system for a programmable scheduler relating to IP routers, comprising:
nodes, wherein a node in the nodes include a network interface unit arranged to communicate packets across a network; and
a router; wherein the router includes:
a network interface unit ananged to receive the packets and transmit packets to the nodes;
a scheduling configuration interface configured to receive parameters relating to a scheduling method wherein the parameters received by the scheduling configuration interface further comprise the number and relative positions of scheduling stages;
a programmable scheduling component configured to implement a one stage scheduling method and a multi-stage scheduling method in response to the parameters received by the scheduling configuration interface, wherein the programmable scheduling component may be re-configured dynamically; and
an output ranged to output packets such that the scheduling method is followed.

3. A method for programmable scheduling of routers, comprising:
receiving a packet;
storing the packet in a physical queue;
determining when to reconstruct a scheduling hierarchy, and when, reconstructing the scheduling hierarchy;
selecting a scheduling method;
selecting an input based on the scheduling method;
determining when to update scheduler parameters;
if the input is connected to a virtual queue, proceeding until the input is connected to a corresponding physical queue, else if the input is connected to said physical queue, taking the packet from the physical queue and transmitting the packet to an output link.

4. The method of claim 3, wherein the scheduling method may be a combination of Priority Queuing method and a Deficit Round Robin method.

5. The method of claim 3, wherein the parameters received by the scheduling configuration interface are related to at least one of a scheduling hierarchy, the number of scheduling stages, and relative positions of the scheduling stages.

6. A method for programmable scheduling of routers, comprising:
receiving a packet;
storing the packet in a physical queue;
determining when to reconstruct a scheduling hierarchy, wherein determining when to reconstruct the scheduling hierarchy, further comprises determining when parameters have been received that relate to the scheduling hierarchy, and when the parameters have been received, reconstructing the scheduling hierarchy;
selecting a scheduling method;
selecting an input based on the scheduling method;
detennining when to update scheduler parameters;
if the input is connected to a virtual queue, proceeding until the input is connected to a corresponding physical queue, else if the input is connected to said physical queue, taking the packet from the physical queue and transmitting the packet to an output link.

7. The method of claim 6, further comprising dynaxmically receiving the parameters.

8. The method of claim 7, wherein selecting the scheduling method further comprises programming the scheduling method in relation to the dynamically received parameters.

9. An apparatus for a programmable scheduler that can support single stage and multi-stage scheduling, comprising:
a scheduling configuration interface that is arranged to receive parameters related to at least one of a cardinality of scheduling stages, a relative order of the scheduling stages in a scheduling hierarchy, and a position of queues in the scheduling hierarchy; and further arranged to provide a scheduling configuration based, at least in part, on the parameters and
an interface arrangement that is configured to receive and output packets, wherein the interface arrangement is configured to output the packets according to the scheduling configuration.

10. The apparatus of claim 9, wherein the scheduling configuration interface is further arranged such that a scheduling method employed by each of the scheduling stages is capable of being modified through dynamic progamming.

11. The apparatus of claim 9, wherein the scheduling configuration interface is further arranged such that the relative order of the scheduling stages is capable of being modified through dynamic programming.

12. The apparatus of claim 9, wherein the position of the queues in the scheduling hierarchy is capable of being modified through dynamic programming.

* * * * *

UNITED STATES PATENT AND TRADEMARK OFFICE
CERTIFICATE OF CORRECTION

PATENT NO. : 7,023,843 B1
APPLICATION NO. : 10/183057
DATED : April 4, 2006
INVENTOR(S) : Jussi Ruutu et al.

It is certified that error appears in the above-identified patent and that said Letters Patent is hereby corrected as shown below:

In the Specification:

First Page Col. 2 (Attorney, Agent, or Firm) Line 1, Delete "PC:" and insert --P.C.;--.

First Page Col. 2 (Abstract), Line 8, After "(DRR)" delete "scheduling is".

Column 2, Line 39 (Approx.) Delete "EMBODIMENT" and insert

-- EMBODIMENTS --.

Column 9, Line 29, Delete "Queueing" and insert -- Queuing --.

Column 12, Line 43, In Claim 9, after "parameters" insert -- ; --.

Column 10, Line 52, Delete "boperator's" and insert -- operator's --.

Column 11, Line 13, In Claim 1, after "implement" delete "an".

Column 11, Line 33, In Claim 2, delete "ananged" and insert -- arranged --.

Column 11, Line 46, In Claim 2, delete "ranged" and insert -- arranged --.

Column 12, Line 22, In Claim 6, delete "detennining" and insert -- determining --.

UNITED STATES PATENT AND TRADEMARK OFFICE
CERTIFICATE OF CORRECTION

| | |
|---|---|
| PATENT NO. | : 7,023,843 B1 |
| APPLICATION NO. | : 10/183057 |
| DATED | : April 4, 2006 |
| INVENTOR(S) | : Jussi Ruutu et al. |

It is certified that error appears in the above-identified patent and that said Letters Patent is hereby corrected as shown below:

Column 12, Line 28-29 (Approx.) In Claim 7, delete "dynaxmically" and insert

-- dynamically --.

Column 12, Line 51 (Approx.) In Claim 10, delete "programming." And insert

--programming.--

Signed and Sealed this

Fifteenth Day of August, 2006

JON W. DUDAS
*Director of the United States Patent and Trademark Office*